United States Patent [19]

Fitch

[11] Patent Number: 5,574,887
[45] Date of Patent: Nov. 12, 1996

[54] APPARATUS AND METHOD FOR EMULATION ROUTINE POINTER PREFETCH

[75] Inventor: Jonathan Fitch, Cupertino, Calif.

[73] Assignee: Apple Computer, Inc., Cupertino, Calif.

[21] Appl. No.: 124,315

[22] Filed: Sep. 20, 1993

[51] Int. Cl.$^6$ .................................. G06F 3/00; H01J 9/00
[52] U.S. Cl. ........................ 395/500; 395/800; 395/376; 364/DIG. 1
[58] Field of Search ..................... 395/500, 375, 395/425, 575, 800, 550, 162, 100, 275, 325, 148, 200, 650, 700; 364/DIG. 1, DIG. 2, 262.4, 946.2, 734, 715.01, 225; 340/825.31

[56] References Cited

U.S. PATENT DOCUMENTS

| | | | |
|---|---|---|---|
| 3,698,007 | 10/1972 | Malcolm et al. | 395/500 |
| 4,003,033 | 1/1977 | O'Keefe et al. | 395/375 |
| 4,087,857 | 5/1978 | Joyce et al. | 395/375 |
| 4,179,737 | 12/1979 | Kim | 395/375 |
| 4,402,042 | 8/1983 | Guttag | 395/550 |
| 4,587,612 | 5/1986 | Fisk et al. | 395/500 |
| 4,714,994 | 12/1987 | Oklobdzija et al. | 395/375 |
| 4,780,819 | 10/1988 | Kashiwagi | 395/500 |
| 4,785,392 | 11/1988 | Maier et al. | 395/375 |
| 4,791,557 | 12/1988 | Angel et al. | 395/375 |
| 4,812,975 | 3/1989 | Adachi et al. | 395/500 |
| 4,847,753 | 7/1989 | Matsuo | 395/375 |
| 4,894,772 | 1/1990 | Langendorf | 395/375 |
| 4,992,934 | 2/1991 | Portanova et al. | 395/375 |
| 5,077,657 | 12/1991 | Cooper et al. | 395/500 |
| 5,140,687 | 8/1992 | Dye et al. | 395/162 |
| 5,167,023 | 11/1992 | de Nicholas et al. | 395/375 |
| 5,237,664 | 8/1993 | Usami | 395/375 |
| 5,249,266 | 9/1993 | Dye et al. | 395/500 |
| 5,361,389 | 11/1994 | Fitch | 395/375 |
| 5,408,622 | 4/1995 | Fitch | 395/500 |

FOREIGN PATENT DOCUMENTS

| | | |
|---|---|---|
| 0025952 | 4/1981 | European Pat. Off. . |
| 0272198 | 6/1988 | European Pat. Off. . |
| 0464494 | 1/1992 | European Pat. Off. . |
| 58-83377 | 5/1983 | Japan . |
| 4205154 | 7/1992 | Japan . |
| 5028040 | 2/1993 | Japan . |
| 8807718 | 10/1988 | WIPO . |

OTHER PUBLICATIONS

McBride, M., "Microprogrammable Chip Set Emulates Mainframe Processing", Electronic Design, Aug. 1984, pp. 229–234, 236, 238, 240.

"High Performance Dual Architecture Processor", IBM Technical Disclosure Bulletin, Feb. 1993, pp. 231–234.

*Primary Examiner*—Kevin J. Teska
*Assistant Examiner*—Jacques Louis-Jacques
*Attorney, Agent, or Firm*—Greg T. Sueoka, Esq.

[57] ABSTRACT

An apparatus and method for emulation routine pointer prefetch are disclosed. The apparatus includes an emulated program counter (EPC), a prefetch state machine, a summing device, an opcode storage device, and a pointer storage device. The EPC, opcode storage device and pointer storage device are coupled to a bus to receive, store and output an emulated program counter value, an opcode value and a pointer to a next emulation routine. The EPC, opcode storage device, and pointer storage device are controlled by the prefetch state machine, which also is coupled to the bus to detect a reference to a reserved memory address and stores an updated emulated program counter value in the EPC using the summing device. The prefetch state machine uses the EPC value to prefetch the next source instruction to be emulated in a first memory operation. A portion of the prefetched source instruction is the opcode value and is stored in the opcode storage device. The prefetch state machine uses the opcode value in a second memory operation to retrieve a pointer to a corresponding emulation routine which is stored in the pointer storage device. The method for emulation routine pointer prefetch preferably comprises the steps of determining if a currently executing emulation routine has issued an instruction to update the EPC; prefetching a next source instruction based upon the value of the EPC; and using an opcode within the prefetched source instruction to prefetch a pointer to a next emulation routine corresponding to the prefetched source instruction.

20 Claims, 9 Drawing Sheets

APPARATUS AND METHOD FOR EMULATION ROUTINE POINTER PREFETCH

CROSS-REFERENCES TO RELATED APPLICATIONS

The present invention relates to U.S. Pat. No. 5,408,622, entitled "Apparatus And Method For Emulation Routine Control Transfer Via Jump Host Instruction and Insertion," which issued on Apr. 18, 1995; U.S. Pat. No. 5,361,389, which issued on Nov. 1, 1994; and U.S. Pat. No. 5,392,408, entitled "Address Selective Emulation Routine Pointer Address Mapping System," which issued on Feb. 21, 1995.

BACKGROUND OF THE INVENTION

1. Field of the Invention

The present invention relates generally to computer instruction emulation, and more particularly to an apparatus and method for accelerating instruction emulation. Still more particularly, the present invention is an apparatus and method for prefetching a pointer to a next emulation routine during execution of a current emulation routine.

2. Description of Related Art

Microprocessors execute machine instructions that result in specific changes of state within the microprocessor hardware. A collection of such instructions, when properly arranged, is known as a program. Execution of a program's instructions in sequence performs a series of state changes that results in useful work, such as adding a column of figures.

Many computer architectures exist, each of which understands a specific and typically unique set of machine instructions or "language." Therefore, a program written for one architecture is useless and incomprehensible to another architecture. Since programs can require a tremendous investment of time and resources to write (hundreds of man years of skilled labor in some cases), and are limited to a single architecture, it is desirable to have a means to translate the program from one language to another. Such a translator would allow the investment made in writing programs for one architecture to be retained for writing the same program on other architectures.

Three broad solutions to the problem of architecture-specific program execution exist. These solutions are static recompilation, dynamic recompilation, and interpretive emulation. In each case, an emulation program is written, usually on the alternative or host architecture, that translates a sequence of source program instructions intended for the source or emulated architecture into one or more instructions in the host's instruction language that perform the same function. The emulation program can be written to simulate the actions of each source program instruction individually, or to simulate the actions of several source program instructions in a single step. In general, simulation of each source program instruction individually provides greater emulation accuracy at the expense of execution speed.

In static recompilation, the emulated program is swept through in its entirety prior to execution and translated into a host program. The host program is then executed. This is rarely a complete solution since most programs exhibit dynamic behavior that cannot be predicted statically. For example, a branch instruction may depend upon a result computed by previous instructions that cannot be predicted prior to running the program. Therefore, the branch instruction cannot be translated to its meaningful counterparts in the host's language. Static recompilation also suffers from the shortcoming of requiring significant amounts of memory to store the translated copy of the program. In addition, static recompilation requires a complete understanding of the behavior of all possible programs. Thus, static recompilation is not a complete solution to effectively translating computer programs for emulation.

Dynamic recompilation allows emulation of programs that exhibit dynamic behavior such as branch instructions. In dynamic recompilation, programs are statically translated until a problem instruction (usually a branch) that cannot be accurately translated is reached. The translated program is then executed up to this point such that the architectural state of the emulated machine is updated. The problem instruction can then be emulated by the execution of an emulation routine corresponding to the problem instruction, after which static translation can begin again. This method can successfully emulate any program and is efficient if large sections of source instructions can be statically translated. However, the translator must run concurrently with the emulated program, and adds significant overhead to the emulation process. The speed and memory requirements are also difficult to predict, and will vary greatly depending upon the character of the emulated program.

Interpretive emulation emulates each source instruction as a separate entity. Interpretive emulation provides an architecturally distinct state at each emulated source instruction boundary, and is the most accurate and interactive of the three emulation techniques. Interpretive emulation typically has a predictable and potentially small memory requirement, since no translated copy of the program need be stored. However, interpretive emulation can be the slowest method, requiring many more host instructions to emulate a given source instruction as compared to either static or dynamic recompilation.

Interpretive emulation is the most desirable emulation technique in terms of emulation accuracy and robust performance; unfortunately, it is typically the slowest emulation technique. The most straightforward method of implementing an interpretive emulator is to employ a dispatch loop within the emulator to fetch a source instruction from the source program stream, and to use the binary value of the operation code (opcode) within the source instruction to index a table in memory. The value of the table entry, referred to here as a "pointer," is the address of an emulation routine consisting of host instructions that implement the architectural changes of state required to emulate the original source instruction. The dispatch loop issues a jump to the address indicated by the pointer, after which the emulation routine is executed. The final host instruction within the emulation routine returns control to the dispatch loop, which fetches the next source instruction from the source program.

The prior art emulation systems and methods suffer from a major performance problem in that a given set of memory-based operations is identically performed for each source instruction that is emulated. For example, for every emulated source instruction, the source instruction and a pointer to an appropriate emulation routine must be retrieved from memory. That is, the source instruction fetch and pointer fetch operations rely upon values being returned from memory, and each of these operations is required prior to the emulation of a given source instruction. Operations that require memory interaction typically require much more time to execute than other operations. If the targeted data does not reside within a cache, the fetch operations indicated above can take longer to execute than an entire emulation routine. This greatly increases the time required to emulate the source instruction. Reducing the time required to obtain a result from even one of these operations can significantly reduce the time required to emulate an entire program of source instructions. What is needed is an apparatus and method for accelerating interpretive emulation by minimizing the delay between the completion of a current emulation routine and the availability of the pointer to the next emulation routine.

SUMMARY OF THE INVENTION

The present invention is an apparatus and method for prefetching an emulation routine pointer while a current emulation routine executes. The apparatus comprises an emulated program counter (EPC), a summing means, a prefetch state machine, an opcode storage means, and a pointer storage means. The EPC is used to store an emulated program counter value that indicates a next source instruction of the source program to be emulated. Within a currently executing emulation routine corresponding to a current source instruction, reference to a memory address within a set of reserved addresses is used to reference a predetermined EPC increment. Each reserved address is recognized by the prefetch state machine, which updates the EPC by a corresponding amount. The prefetch state machine then stores the updated emulated program counter value in the EPC. The prefetch state machine next uses the updated EPC to prefetch the next source instruction to be emulated in a first direct memory access (DMA) operation. A plurality of bits within the prefetched source instruction form an opcode that is stored in the opcode storage means. The prefetch state machine uses the value within the opcode storage means in a second DMA operation to index a table in memory containing a pointer to a corresponding emulation routine. The pointer is returned from the table and stored in the pointer storage means. The apparatus of the present invention functions while the current emulation routine executes. In this manner, the host instructions within the current emulation routine are executed while the apparatus of the present invention obtains the pointer to the next emulation routine.

The method of the present invention preferably comprises the steps of determining if a currently executing emulation routine has issued an instruction to update the EPC; after the EPC has been updated, prefetching a next source instruction based upon the value of the EPC; and utilizing an opcode within the prefetched source instruction to prefetch a pointer to a next emulation routine corresponding to the prefetched source instruction. The method of the present invention is performed concurrent with the execution of each emulation routine, thereby performing the steps required for obtaining the pointer to the next emulation routine while the current emulation routine executes.

DETAILED DESCRIPTION OF THE PREFERRED EMBODIMENTS

Figure 1:
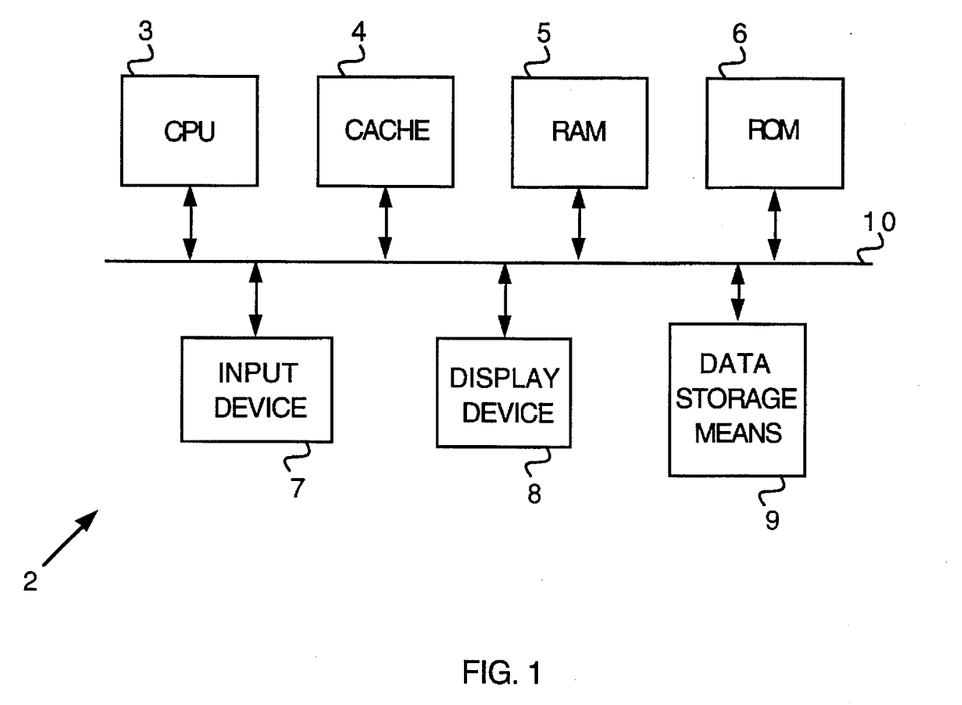
FIG. 1 is a block diagram of a computer system capable of functioning with the apparatus and method of the present invention.

Referring now to FIG. 1, a block diagram of a host computer system 2 capable of functioning with the apparatus and method of the present invention is shown. The host computer system 2 comprises a central processing unit (CPU) 3, a cache memory 4, given amounts of random access memory (RAM) 5 and read-only memory (ROM) 6, an input device 7 such as a keyboard, an output or display device 8, and a data storage means 9 such as a hard disk drive. All elements of the host computer system 2 are coupled to a common bus 10 in a Von Neumann architecture, where the common bus 10 comprises an address bus 12, a data bus 14, and a control bus 16. An exemplary host computer system comprises a Motorola 88000 CPU, a Motorola 88200 16-kilobyte cache, 8 megabytes of RAM, a keyboard, a color display, and an 80 megabyte hard disk.

Figure 2:
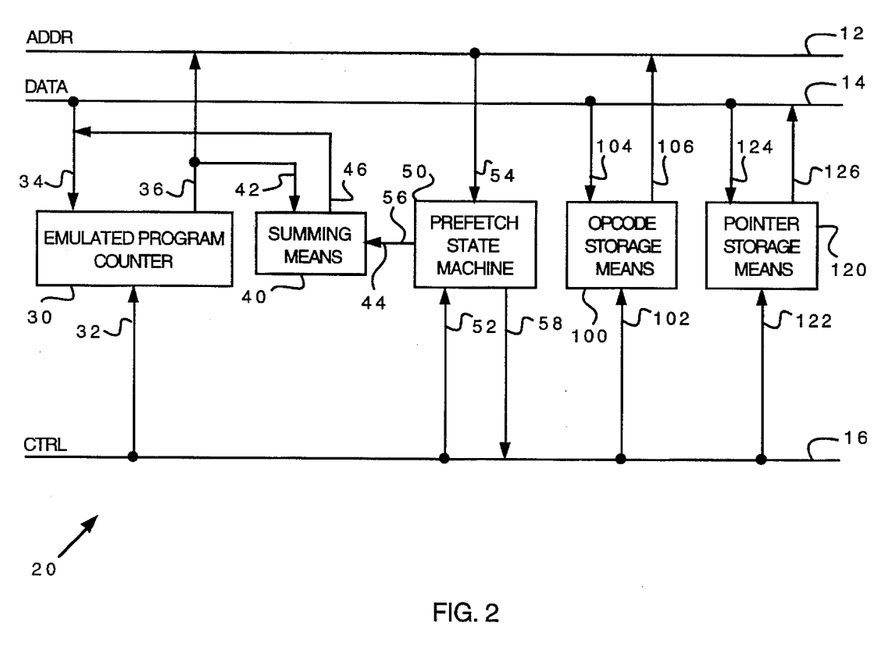
FIG. 2 is a block diagram of a first and preferred embodiment of a prefetching apparatus constructed in accordance with the present invention.

Referring now to FIG. 2, a preferred embodiment of an apparatus 20 constructed in accordance with the present invention is shown. The preferred embodiment of the apparatus 20 comprises an emulated program counter (EPC) 30, a summing means 40, a prefetch state machine 50, an opcode storage means 100, and a pointer storage means 120. The address bus 12, data bus 14, and control bus 16 serve to provide couplings between the elements of the apparatus 20 and the host computer system 2 of FIG. 1. In the preferred embodiment of the apparatus 20, the address bus 12, the data bus 14, and the control bus 16 are each 32 bits wide.

The host computer system 2 executes an interpretive emulator having a dispatch loop. The dispatch loop uses an address indicated by a pointer to jump to an emulation routine. The emulation routine is then executed by the host computer system 2. During the execution of the emulation routine, the apparatus 20 of the present invention prefetches another pointer to a next emulation routine. Upon completion of the currently-executing emulation routine, the pointer to the next emulation routine is immediately available for use in the dispatch loop.

The EPC 30 stores an emulated program counter value that indicates the address of the next source instruction. The prefetch state machine 50 updates the EPC 30 via the summing means 40. After the EPC 30 has been updated, the prefetch state machine 50 uses the contents of the EPC 30 to prefetch the next source instruction to be emulated. The opcode storage means 100 stores a plurality of bits of the next source instruction, where the plurality of bits is an opcode. Each source instruction has a unique opcode. On a computer system capable of executing source instructions directly (i.e., without emulation), each opcode corresponds to a microprogram that is executed to carry out the actions associated with the source instruction. The prefetch state machine 50 uses the contents of the opcode storage means 100 to prefetch a pointer to the next emulation routine. After the pointer to the next emulation routine has been prefetched, it is available to the interpretive emulator's dispatch loop.

The EPC 30 is preferably a data storage means having a control input 32, a load input 34, and an output 36. The control input 32 of the EPC is coupled to the control bus 16, the load input 34 is coupled to the data bus 14, and the output 36 is coupled to the address bus 12. The EPC 30 can load a value in response to an appropriate control signal on the control bus 16. When such a control signal is received at the EPC's control input 32, the EPC 30 loads the value at it's load input 34 from the data bus 14. The CPU 3 loads the EPC 30 with an initial emulated program counter value in this manner during initialization of the apparatus 20. The emulation routine for a source instruction corresponding to a branch also causes the CPU 3 to directly load the EPC 30. The contents of the EPC 30 correspond to a program counter indicating the next source instruction to be emulated from a source instruction program. This value appears at the output 36 of the EPC 30. The program counter value contained within the EPC 30 indicates the address of the next source instruction to be emulated; thus, the EPC 30 contents are an emulated program counter value. In contrast, the program counter of the host computer system 2 indicates the address of the next host instruction that the host computer system 2 is to execute. In an exemplary embodiment, the EPC 30 is a register formed of D-flip flops.

The summing means 40 preferably comprises an adder having a first input 42, a second input 44, and an output 46. The first input 42 of the summing means 40 is coupled to the output 36 of the EPC 30, the second input 44 of the summing means 40 is coupled to the prefetch state machine 50, and the output of the summing means 46 is coupled to the EPC's load input 34. The summing means 40 is used to determine the next source instruction to be emulated following a current source instruction by incrementing the emulated program counter value stored in the EPC 30. The summing means 40 increments the emulated program counter value according to the execution of a predetermined host instruction within the current source instruction's emulation routine. An emulated program counter value received at the summing means' first input 42 is added to an appropriate increment value generated by the prefetch state machine 50, to produce an updated emulated program counter value at the output 46 of the summing means 40. The output 46 of the summing means 40 is coupled to the input 34 of the EPC 30 to store the updated emulated program counter value in the EPC 30.

The prefetch state machine 50 is preferably a state machine capable of issuing apparatus 20 control and DMA commands, and has a control input 52; an increment code input 54; an increment signal output 56; and a control output 58. The control input 52 and the control output 58 are coupled to the control bus 16, and the increment code input 54 is coupled to the address bus 12. The increment signal output 56 is coupled to the second input 44 of the summing means 40. The prefetch state machine 50 performs DMA operations and issues commands to the EPC 30, the opcode storage means 100, and the pointer storage means 120 via the control output 58.

Within the source instruction set, each source instruction to be emulated can vary in length. The emulated program counter value indicates the address of the next source instruction to be emulated, and thus, the EPC 30 can be accurately incremented only from within the current source instruction emulation routine. In the preferred embodiment of the apparatus 20, a set of memory addresses is reserved, where each reserved address corresponds to a value by which the EPC 30 may be incremented. During the execution of every source instruction emulation routine, a host instruction causes a reserved address to be placed upon the address bus 12. The reserved address indicates the amount that the EPC is to be incremented. The prefetch state machine 50 monitors the address bus 12 via its increment code input 54, and detects whether the address present upon the address bus 12 is one of the reserved addresses. While the prefetch state machine 50 is monitoring the address bus 12 for the presence of a reserved address, it is in its initial state. If a reserved address is detected, the prefetch state machine 50 decodes the reserved address and generates an increment signal corresponding to the value by which the EPC 30 is to be incremented. For example, if address 1000 has been reserved to indicate that the EPC 30 must be incremented by two, a host instruction within the current source instruction's emulation routine referring to address 1000 causes address 1000 to appear upon the address bus 12. The prefetch state machine 50 detects that address 1000 is a reserved address, and decodes address 1000 to generate an increment signal corresponding to the value two. The prefetch state machine 50 outputs the increment signal at its increment signal output 56, such that the summing means 40 produces the sum of the value currently in the EPC 30 plus the value provided by the prefetch state machine 50. Alternatively, a reserved address reference can cause a corresponding increment value to be stored in a register (not shown) having an input coupled to the data bus 14. The register also has an output coupled to the second input of the summing means 40, such that the summing means 40 produces the sum of the value currently in the EPC 30 plus the value currently in the register.

The prefetch state machine 50 next issues an access disable command to the pointer storage means 120 via the control output 58. The access disable command prevents the pointer storage means 120 from recognizing commands issued by the CPU 3, thereby preventing the dispatch loop from accessing the pointer storage means 120 until the prefetch state machine 50 has completed all operations involved in prefetching the pointer to the next emulation routine. Next, the prefetch state machine 50 issues a load command at its control output 58 that causes the EPC 30 to load the output 46 of the summing means 40 into the EPC 30.

The control input 52 of the prefetch state machine 50 is used to detect when a load command has been issued to the EPC 30. Such a condition will be detected after the prefetch state machine 50 issues the appropriate load command, or after the CPU 3 issues the load command. In either case, the load command causes the EPC 30 to load the data at the inputs 34 of the EPC 30. Once an EPC load command has been detected, the prefetch state machine 50 assumes that the EPC 30 contains an updated emulated program counter value, which corresponds to the address of the next source instruction to be emulated.

Subsequent to issuing the EPC load command, the prefetch state machine 50 issues a first DMA read command via its control output 58, causing the value within the EPC 30 to be used as the address at which to perform the read. This address contains a next source instruction to be emulated. As a result of the first DMA read operation, the next source instruction is placed upon the data bus 14. The prefetch state machine 50 then issues a load opcode command to the opcode storage means 100 via its control output 58, causing the opcode storage means 100 to store a plurality of bits of the next source instruction that are the opcode.

Following issuance of the load opcode command, the prefetch state machine 50 issues a second DMA read command via the control output 58. In the second DMA read command, the opcode stored within the opcode storage means 100 is used to index a table in memory, where the table contains pointers to emulation routines. Upon completion of the second DMA read command, the pointer corresponding to the emulation routine indicated by the opcode is placed upon the data bus 14. The prefetch state machine 50 next issues a load pointer storage command to the pointer storage means 120 via the control output 58, causing the pointer storage means 120 to load the pointer value present on the data bus 14. Following issuance of the load pointer storage command, the prefetch state machine 50 issues an access enable command to the pointer storage means 120 via the control output 58. The access enable command allows the pointer storage means 120 to recognize commands issued from the CPU 3, thereby making the pointer to the next emulation routine available to the dispatch loop. Thus, once the access enable command is issued, the pointer is immediately available to the dispatch loop upon completion of execution of the current emulation routine.

The opcode storage means 100 preferably comprises a data storage means having a control input 102, an opcode input 104, and an address output 106. The control input 102 is coupled to the control bus 16, while the opcode input 104 and the address output 106 are coupled to the data bus 14 and address bus 12, respectively. Upon receipt of a load opcode command at its control input 102, the opcode storage means 100 loads a plurality of bits representing an opcode from a signal present at its opcode input 104. As the load opcode command is issued by the prefetch state machine 50 after the first DMA read command, the signal present at the opcode input 104 is the next source instruction to be emulated. The opcode storage means 100 therefore loads the next source instruction's opcode. Each source instruction has a unique opcode, and the set of all source instruction opcodes is a set of consecutive integers. Therefore, each opcode is used as an offset to a base memory address to indicate a unique memory address within a consecutive memory address range. This in turn uniquely associates each source instruction with a memory address within the consecutive memory address range. Each memory address within the consecutive memory address range stores a pointer to the emulation routine for the source instruction associated with the memory address. Within the opcode storage means 100, a plurality of bits are reserved for indicating the base memory address. The CPU 3 issues a load base memory address command to the opcode storage means 100 prior to starting the source instruction program's emulation. When the prefetch state machine 50 issues the load opcode command, the opcode bits present upon the data bus are loaded into the opcode storage means 100 such that the opcode bits are concatenated with the base memory address bits, thereby generating the memory address of the pointer to the next emulation routine. This memory address is used in the second DMA read command.

Those skilled in the art will recognize that in an alternate embodiment of the apparatus 20, the opcode storage means 100 can be implemented as a buffer capable of storing a plurality of source instruction opcodes received from a burst memory read operation performed by the prefetch state machine 50.

The pointer storage means 120 is preferably a data storage means having a control input 122, a data input 124, and a data output 126. The control input 122 is coupled to the control bus 16, and the data input 124 and data output 126 are coupled to the data bus 14. The pointer storage means 120 receives commands via its control input 122. The prefetch state machine 50 issues a load pointer storage command to the pointer storage means 120 when the next emulation routine pointer is available on the data bus 14. Immediately after this value has been stored in the pointer storage means 120, the dispatch loop of the emulator can access the pointer value and initiate a jump to the address of the next emulation routine. If the memory latencies are low, the pointer stored in the pointer storage means 120 is likely to contain the pointer value before the current emulation routine has completed its execution. In this case, there will be no delay between completion of the current emulation routine and availability of the pointer for the dispatch loop. In the event that the pointer was not in the cache, there may be a noticeable delay between these two events. However, any delay will be dramatically shorter than that experienced in prior art interpretive emulators, since in prior art interpretive emulators the operations of fetching the next source instruction and fetching the pointer to the next emulation routine would not begin until after the current emulation routine has completed its execution. These fetch operations can take as long as the execution of an entire emulation routine. The apparatus 20 of the present invention performs these fetch operations concurrent with the execution of the current emulation routine, thereby minimizing any delay between completion of the current emulation routine and the availability of the pointer to the next emulation routine. This results in significantly accelerated interpretive emulation. In order to ensure that the dispatch loop always uses an updated pointer value, a hardware interlock is used, wherein the prefetch state machine 50 issues access enable and access disable commands to the pointer storage means 120. Those skilled in the art will recognize that the hardware interlock can be implemented via a direct coupling (not shown) between the prefetch state machine 50 and the pointer storage means 120 rather than via the control bus 16.

Figure 3:
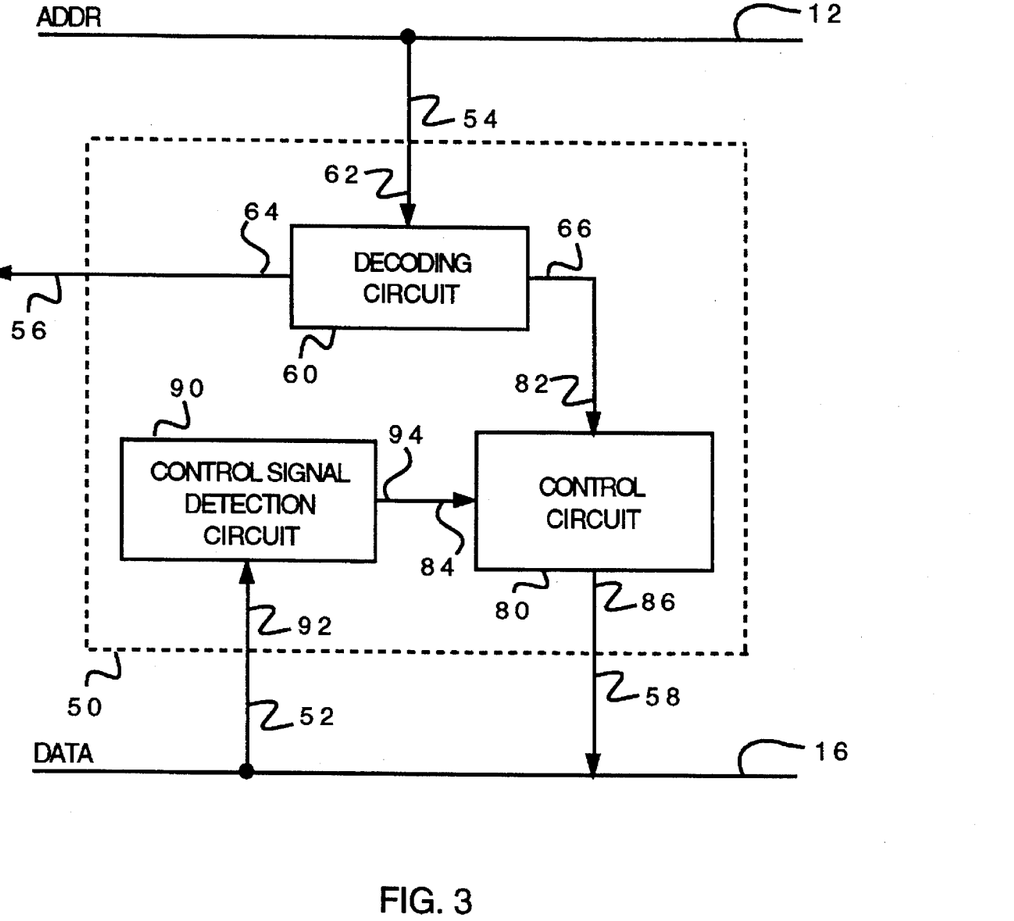
FIG. 3 is a block diagram of a preferred embodiment of the prefetch state machine of the present invention.

Referring now to FIG. 3, a block diagram of the preferred embodiment of the prefetch state machine 50 of the apparatus 20 is shown. The prefetch state machine 50 preferably comprises a decoding circuit 60, a control circuit 80, and a control signal detection circuit 90. The decoding circuit 60 comprises a decoder having an input 62, a decoded output 64, and an acknowledgment output 66. The input 62 of the decoding circuit 60 forms the prefetch state machine's increment code input 54, and is coupled to the address bus 12. Since the input 62 is coupled to the address bus 12, the decoding circuit 60 receives all addresses asserted on the address bus 12. The decoded output 64 provides the prefetch state machine's increment signal output 56. If an address received corresponds to one of the reserved addresses indicating a given increment to the emulated program counter value, the decoding circuit 60 produces an appropriate increment value at its decoded output 64. This value is used by the summing means 40 to update the EPC 30 by an amount corresponding to the particular reserved address received. In response to receipt of one of the reserved addresses, the decoding circuit 60 also produces an acknowledgment signal at its acknowledgment output 66. The acknowledgment signal is used by the control circuit 80 to initiate a sequence of state control commands. In the preferred embodiment, the decoding circuit 60 comprises a 32-bit decoder, receiving 32-bit addresses from the address bus 12 and outputting a 4-bit increment value.

The control signal detection circuit 90 preferably comprises combinational logic having an input 92 and an output 94. The control signal detection circuit's input 92 forms the control input 52 of the prefetch state machine 50. Commands present upon the control bus 16 arrive at the control signal detection circuit's input 92, whereupon the control signal detection circuit 90 determines whether the command is an EPC load command. In the preferred embodiment, commands other than an EPC load command are ignored. Receipt of an EPC load command causes the control signal detection circuit 90 to generate a state advance signal at its output 94. The state advance signal indicates that the EPC 30 is being loaded with an updated EPC value present at the output 46 of the summing means 40, or that the EPC 30 is being directly loaded by the CPU 3. This in turn indicates that the first DMA read operation can occur using the contents of the EPC 30 as the memory address at which to perform the read.

The control circuit 80 preferably comprises control logic for issuing the sequence of state control commands in response to the acknowledgment signal or the state advance signal, and includes a first state control input 82, a second state control input 84, and a command output 86. The first state control input 82 is coupled to the acknowledgment output 66 of the decoding circuit 60, the second state control input 84 is coupled to the output 94 of the control signal detection circuit 90, and the command output 86 is the control output 58 of the prefetch state machine 50 and is coupled to the control bus 16. The control circuit 80 receives the acknowledgment signal at the first state control input 82 and the state advance signal at the second state control input 84. Prior to receiving either of these signals, the control circuit 80 is in an initial state. Receipt of the acknowledgment signal indicates that a reference to one of the reserved addresses has been made, and causes the control circuit 80 to issue a sequence of state control commands. This sequence of commands includes the pointer storage means access disable command, the EPC load command, the first DMA read command, the opcode storage means load command, the second DMA read command, the pointer storage means load command, and the pointer storage means access enable command. Receipt of the state advance signal causes the control circuit 80 to issue the pointer storage means access disable command followed by continuing operation from the first DMA read command. Each command is issued via the command output 86. The control circuit 80 returns to its initial state after the access enable command has been issued to the pointer storage means 120. In the preferred embodiment, the control circuit 80 is referenced to a system clock, thereby ensuring each command is issued at an appropriate time.

Figure 4:
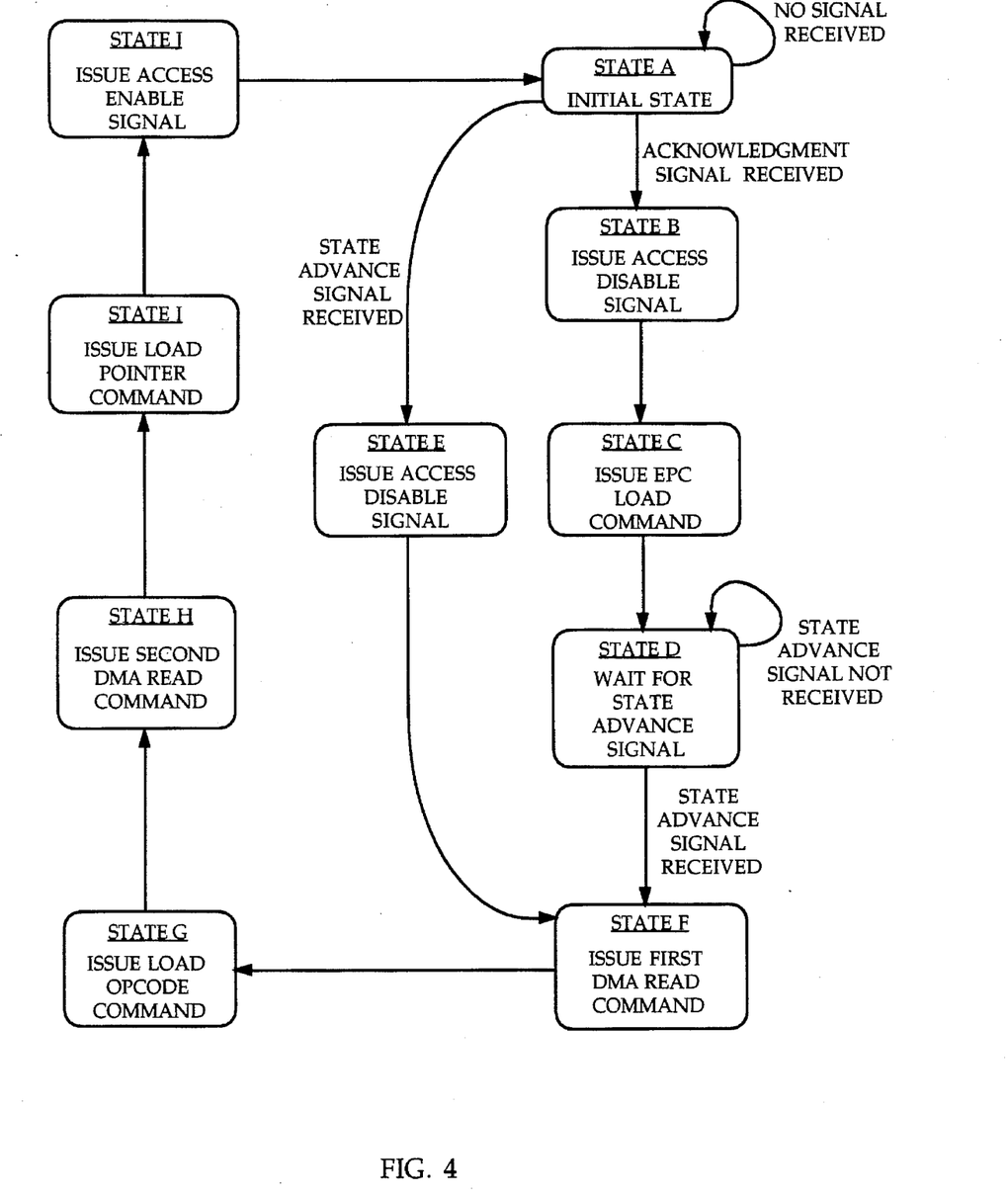
FIG. 4 is a state diagram of a preferred embodiment of a control circuit of the present invention.

Referring now to FIG. 4, a state diagram for the operation of the control circuit 80 of the preferred embodiment is shown. Control circuit 80 operation begins in an initial state A, with the control circuit 80 waiting for receipt of the acknowledgment signal or the state advance signal. If neither of these signals are received, the control circuit 80 remains in its initial state. Upon receipt of the acknowledgment signal, the control circuit 80 proceeds to state B and issues an access disable command to the pointer storage means 120. The control circuit 80 next issues the EPC load command in state C. After issuance of the EPC load command, the control circuit 80 proceeds to state D, waiting for receipt of the state advance signal from the control signal detection circuit 90. Receipt of the state advance signal indicates that the EPC load command has been detected on the control bus 16 by the control signal detection circuit 90. The control circuit 80 remains in state D until the state advance signal has been received. Upon receipt of the state advance signal, the control circuit 80 advances to state F and issues the first DMA read command.

If the state advance signal is detected while the control circuit 80 is in state A, the control circuit 80 proceeds to state E and issues an access disable signal to the pointer storage means 120. Receipt of the state advance signal while in state A indicates that the EPC 30 has been loaded directly by the CPU 2. Following state E, the control circuit 80 proceeds to state F. If the control circuit 80 receives the acknowledgment signal while in state A, operation proceeds through states B, C, and D, followed by state F. Receipt of the state advance signal while in state A causes operation to proceed to state E, followed by state F. Thus, state F is the common state arrived at when the control circuit 80 receives either the acknowledgment signal or the state advance signal while in state A.

After issuance of the first DMA read command in state F, the control circuit 80 proceeds to state G. In state G, the control circuit 80 issues the load opcode command to the opcode storage means 100, thereby storing the opcode portion of the next source instruction. Operation continues with the control circuit 80 issuing the second DMA read command in state H to obtain the pointer to the next emulation routine. Following state H, the control circuit 80 advances to state I and issues the load pointer command, thereby causing the pointer storage means 120 to load the pointer to the next emulation routine. After issuance of the load pointer command, the control circuit 80 issues the pointer storage means access enable command in state J. Following state J, the control circuit 80 returns to state A, its initial state. Those skilled in the art will recognize that the control circuit 80 can be implemented with a variety of hardware configurations including combinational logic or a programmable logic array.

Figure 5:
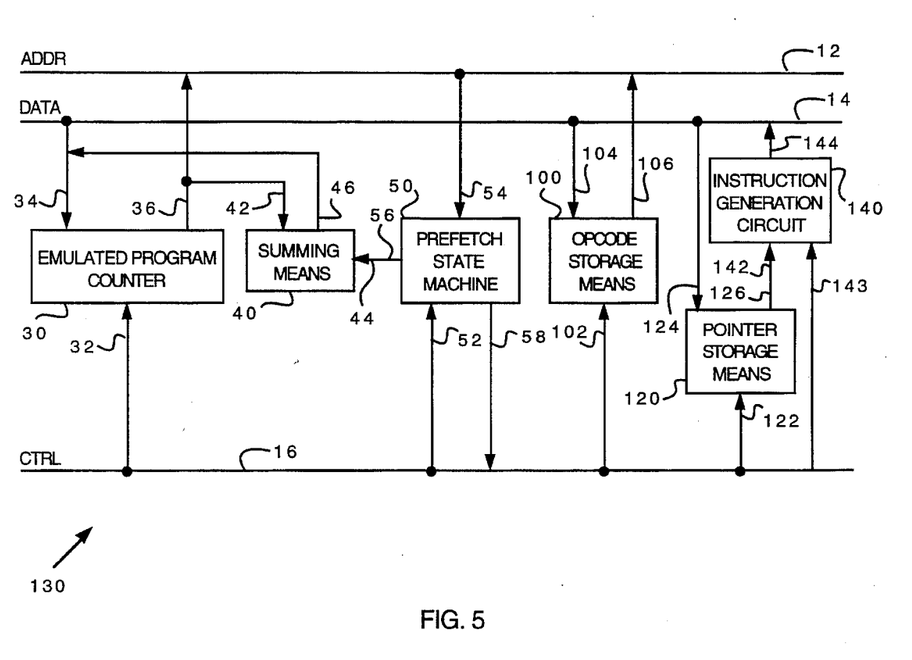
FIG. 5 is a block diagram of a second embodiment of the prefetching apparatus constructed in accordance with the present invention.

Referring now to FIG. 5, a second embodiment of an apparatus 130 constructed in accordance with the present invention is shown. The second embodiment of the apparatus 130 functions on host computer architectures that support long relative and absolute jump instructions. In addition to the components in the preferred embodiment, the apparatus 130 of the second embodiment comprises an instruction generation circuit 140. The instruction generation circuit 140 is used to incorporate the pointer to the next emulation routine into an absolute jump or long relative jump host instruction. Other elements within the second embodiment of the apparatus 130 are equivalent to those within the preferred embodiment, and like reference numbers are used for like components. The instruction generation circuit 140 preferably comprises a register and combinational logic having an input 142, a control input 143, and an instruction output 144. The input 142 is coupled to the output 126 of the pointer storage means 120, the control input 143 is coupled to the control bus 16, and the instruction output 144 is coupled to the data bus 14. The instruction generation circuit 140 receives the pointer stored within the pointer storage means 120, and incorporates the pointer into an absolute or long relative jump host instruction. After incorporating the pointer into the jump host instruction, the instruction generation circuit 140 stores the jump host instruction in its register. Since the pointer stored within the pointer storage means 120 indicates the address of the next emulation routine, execution of the absolute or long relative jump host instruction results in a jump to the address indicated by the pointer. After executing the host instructions required to emulate the behavior of the current source instruction, the current emulation routine retrieves and executes the jump host instruction present within the instruction generation circuit's register. This completes the execution of the current emulation routine, and automatically transfers operation to the next emulation routine. If the absolute jump or long relative jump host instruction has been stored in the register prior to the current emulation routine's access to the register, there will be no delay between completion of the current emulation routine and initiation of the next emulation routine's execution. In the second embodiment, prefetch state machine 50 does not issue the access enable and access disable commands to the pointer storage means 120 since the pointer storage means output 126 is coupled to the input 142 of the instruction generation circuit 140 rather than to the data bus 14. Instead, the prefetch state machine 50 issues the access enable and access disable commands to the instruction generation circuit 140. This prevents the current emulation routine from retrieving a jump host instruction after an EPC 30 update reference has been made and before the next host jump instruction has been stored in the instruction generation circuit's register. Although the access enable and access disable commands are issued to the instruction generation circuit 140 rather than to the pointer storage means 120 in the second embodiment, issuance of each command occurs at the time indicated in the preferred embodiment.

Figure 6:
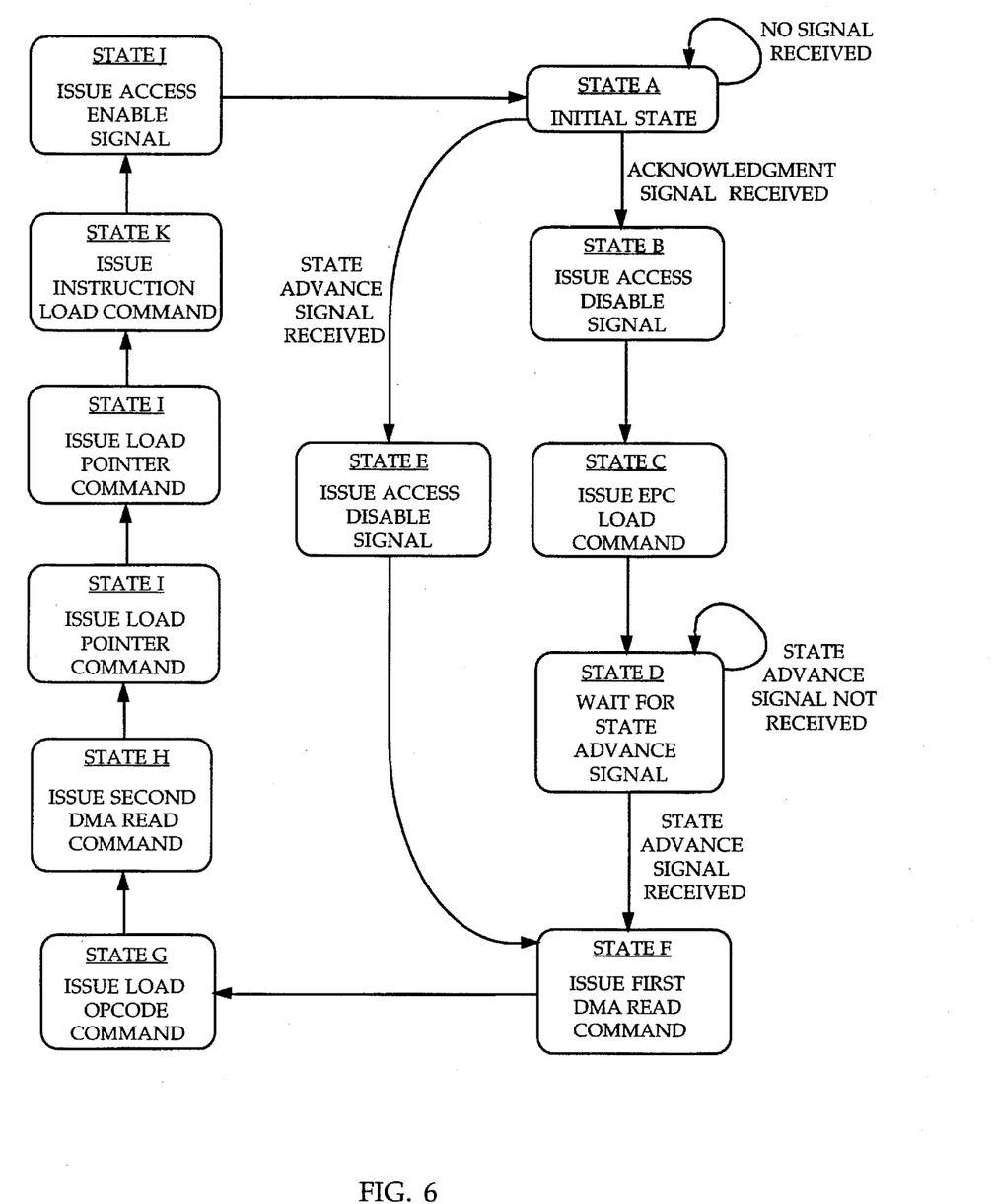
FIG. 6 is a state diagram of a second embodiment of the control circuit of the present invention.

Referring now to FIG. 6, a state diagram for second embodiment of the control circuit 80 within the prefetch state machine 50 of the present invention is shown. Like state designations have been used for like states in FIG. 4 and FIG. 6. The state diagram for the control circuit 80 of the second embodiment is identical to that of the preferred embodiment, with the exception of an additional state K in which the control circuit 80 issues an load command to the instruction generation circuit 140, causing the instruction generation circuit 140 to load the jump host instruction into its register. State K occurs after issuance of the load pointer command in state I and prior to issuance of the access enable command in state J. As mentioned above, in the second embodiment of the present invention, the access disable and access enable commands are issued to the instruction generation circuit 140 rather than to the pointer storage means.

Figure 7:
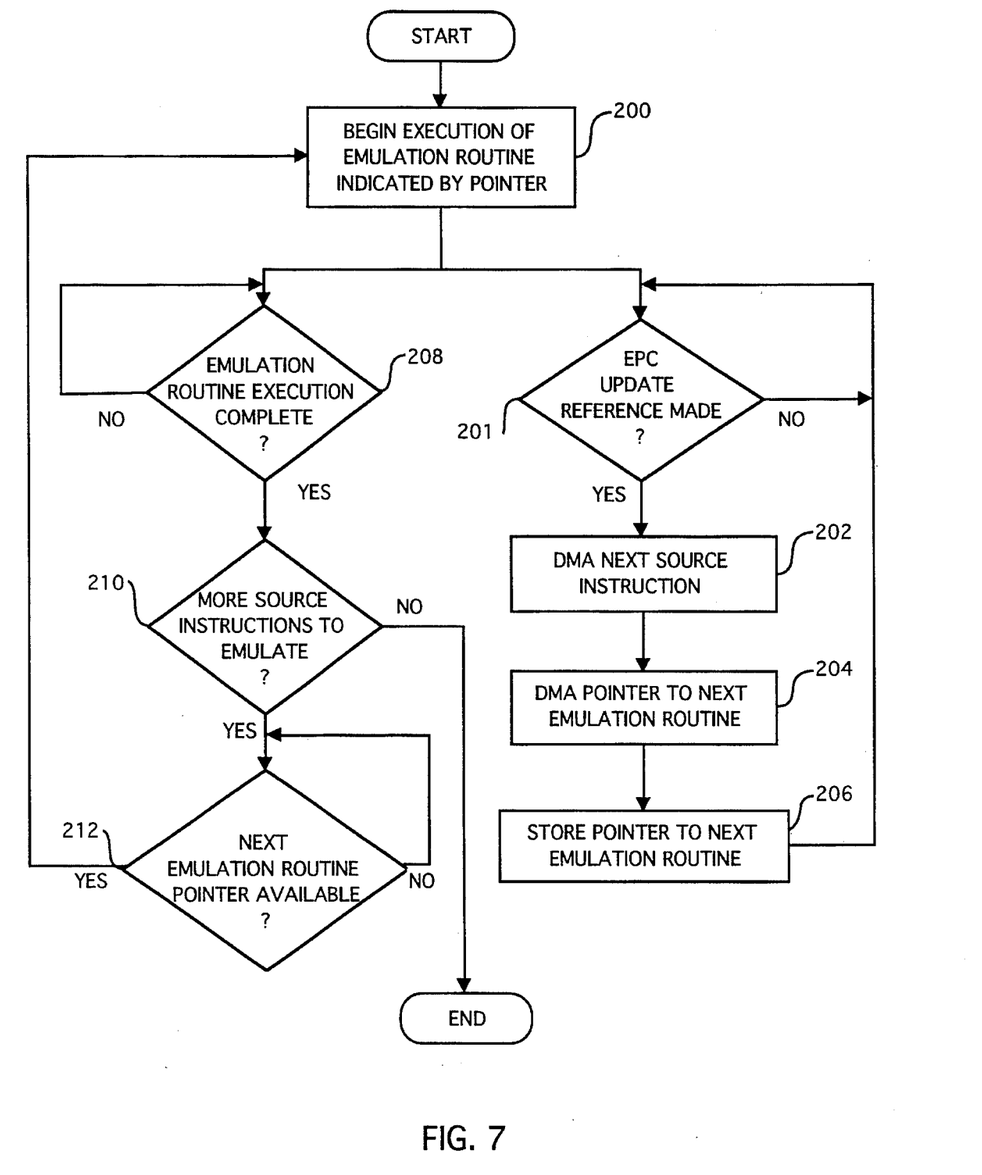
FIG. 7 is a flowchart illustrating a first method for prefetching an emulation routine pointer.

Referring now to FIG. 7, a first method for emulation routine pointer prefetch is shown. The first method begins in step 200 by beginning the execution of an emulation routine. The method next proceeds to steps 201 and 208 concurrently. In step 201, the method determines whether an EPC update reference has been made. If the EPC update reference has not been made, the first method remains at step 201 until such reference is made within the currently-executing emulation routine. Each emulation routine makes a single EPC update reference at some point during its execution. If the EPC update reference has occurred, the first method next performs a first DMA read operation in step 202 using the updated value in the EPC 30 to indicate the memory read address. As a result of the first DMA read operation, the first method obtains the next source instruction. Next, in step 204, the first method performs a second DMA read operation using an opcode within this source instruction to indicate the memory read address, to obtain the pointer to the next emulation routine. The first method then stores the pointer to the next emulation routine in step 206. Steps 202, 204, and 206 may occur before or after execution of the current emulation routine has been completed. After step 206, the first method returns to step 201. Since each emulation routine makes a single EPC 30 update reference, steps 201 through 206 are performed once during the execution of each emulation routine.

In step 208, the first method determines whether execution of the current emulation routine has been completed. If not, the first method remains in step 208. Upon completion of the current emulation routine's execution, the first method proceeds to step 210 and determines if more source instructions are to be emulated. If there are no more source instructions to emulate, the first method ends. The presence of more source instructions to emulate causes the first method to proceed to step 212, wherein the first method determines if the pointer to the next emulation routine is available. In the event that steps 201 through 206 are not completed before completion of the current emulation routine's execution, step 212 ensures that the host processor waits for the pointer to the next emulation routine before proceeding. If the pointer to the next emulation routine is not available, the first method remains at step 212. Availability of the pointer to the next emulation routine allows the first method to return to step 200, to execute the next emulation routine.

Figure 8:
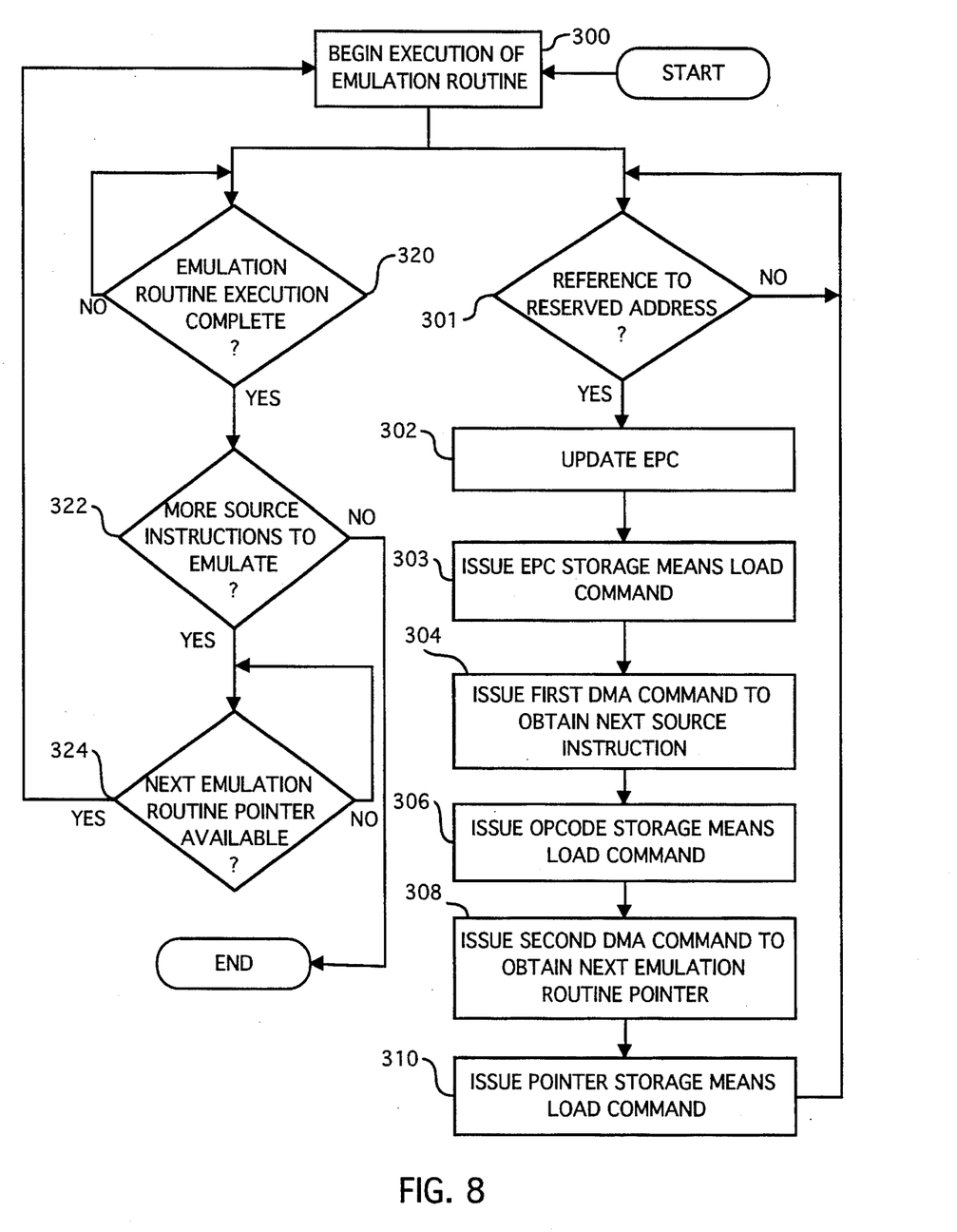
FIG. 8 is a flowchart illustrating a second and preferred method for prefetching an emulation routine pointer.

Referring now to FIG. 8, a second and preferred method for emulation routine pointer prefetch is shown. The preferred method begins in step 300 by beginning the execution of the emulation routine. Next, the preferred method proceeds to steps 301 and 320 concurrently. In step 301, the preferred method determines whether a reserved address reference has been made. The reserved address reference corresponds to an EPC update request. If the reserved address reference has not been made, the preferred method remains at step 301 until one occurs. Each emulation routine makes a single reference to a reserved address at some point during its execution. If the reserved address reference has occurred, the preferred method updates the emulated program counter value by an amount corresponding to the reserved address reference in step 302. In step 303, the preferred method issues a load command directed to the EPC 30, thereby storing the updated emulated program counter value in the EPC 30. Next, in step 304, the preferred method issues a first DMA read command, wherein the contents of the EPC 30 are used to indicate the memory read address. As a result of the first DMA read command, the next source instruction to be emulated is returned from memory 5. In step 306, the preferred method issues a load command directed to an opcode storage means 100, such that a plurality of bits corresponding to an opcode within the next source instruction is stored within the opcode storage means 100. Following step 306, the preferred method issues a second DMA read command in step 308, wherein the contents of the opcode storage means 100 are used to indicate the memory read address. The second DMA read command causes a pointer to the next emulation routine to be returned from memory 5. In step 310, the preferred method issues a load command to a pointer storage means 120, such that the pointer to the next emulation routine is stored within the pointer storage means 120. This pointer is available for use by the interpretive emulator's dispatch loop after this point. Steps 302, 303, 304, 306, 308 and 310 can occur before or after execution of the current emulation routine has been completed. Since each emulation routine makes a single reference to a reserved address, steps 301 through 310 are performed once during the execution of each emulation routine. After step 310, the preferred method returns to step 301.

In step 320, the preferred method determines whether the execution of the current emulation routine has been completed. If the current emulation routine's execution has not been completed, the preferred method remains at step 320. If the current emulation routine's execution has been completed, the preferred method proceeds to step 322 and determines whether there are additional source instructions to be emulated. If not, the preferred method ends. If more source instructions are to be emulated, the preferred method proceeds to step 324. In step 324, the preferred method determines whether the pointer to the next emulation routine is available. In the event that one or more of steps 301 through 310 are not completed before completion of the current emulation routine's execution, step 324 ensures that the preferred method waits for the pointer to the next emulation routine before proceeding. Once the pointer to the next emulation routine is available, the preferred method returns to step 300 to execute the emulation routine pointed to.

Figure 9:
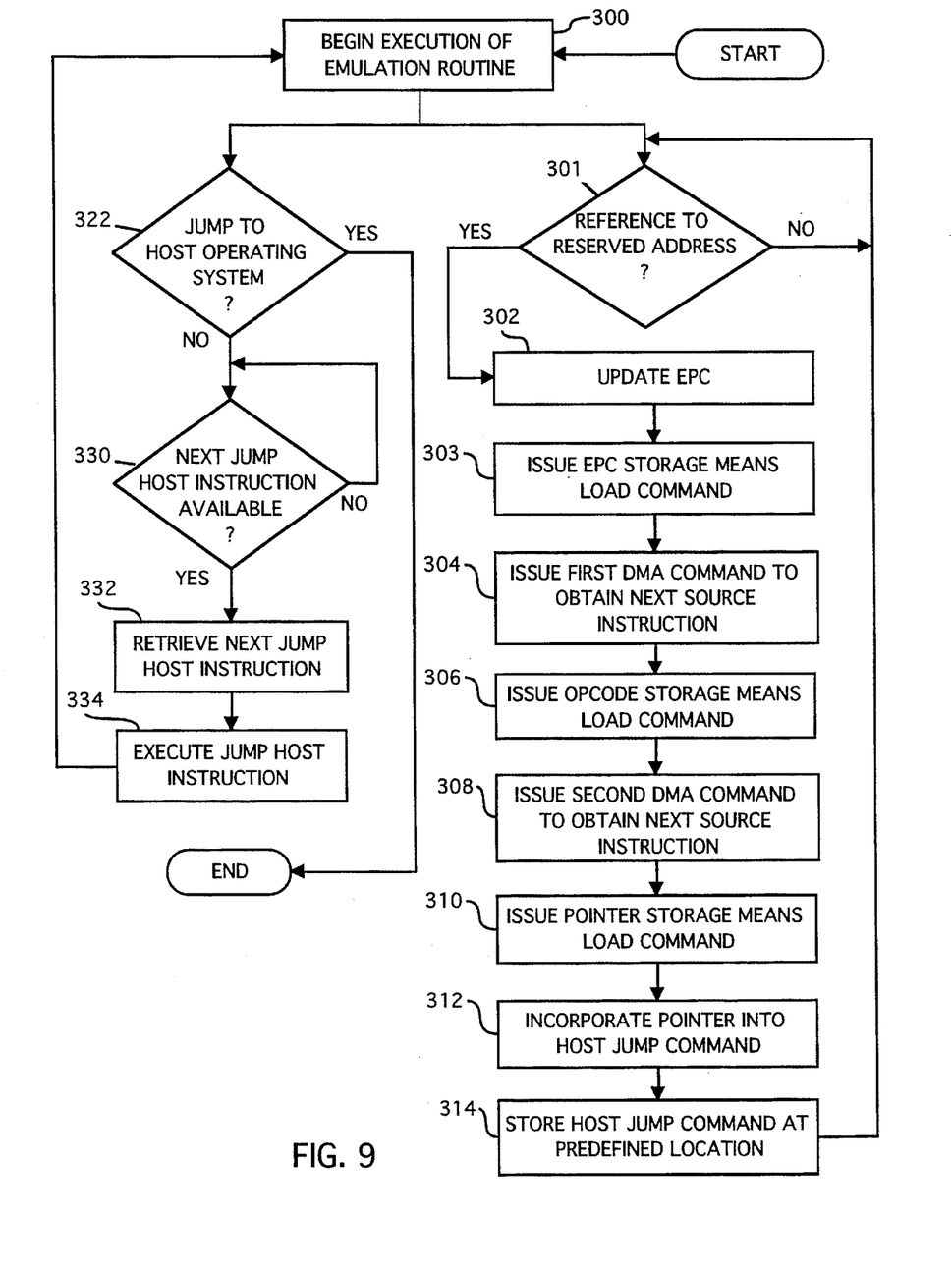
FIG. 9 is a flowchart illustrating a third method for prefetching an emulation routine pointer.

Referring now to FIG. 9, a third method for emulation routine pointer prefetch is shown. Common steps in the preferred method and the third method are given identical reference numbers for ease of understanding. The third method begins in step 300 by beginning the execution of an emulation routine. Next, the third method proceeds to steps 301 and 321 concurrently. In step 301, the third method determines whether a reference to a reserved address has been made. The reserved address reference corresponds to an EPC update request. If the reserved address reference has not been made, the third method remains at step 301. Each emulation routine makes a single reserved address reference at some point during its execution. If the reserved address reference has occurred, the third method updates the emulated program counter value by an amount corresponding to the reserved address reference in step 302. The third method then issues a load command directed to the EPC 30 in step 303, thereby loading the EPC 30 with the updated emulated program counter value. Next, in step 304, the third method issues a first DMA read command, wherein the contents of the EPC 30 are used to indicate the memory read address. As a result of the first DMA read command, the next source instruction to be emulated is returned from memory 5. In step 306, the third method issues a load command directed to the opcode storage means 100, such that a plurality of bits corresponding to the opcode within the next source instruction is stored within the opcode storage means 100. Following step 306, the third method issues a second DMA read command in step 308, wherein the contents of the opcode storage means 100 are used to indicate the memory read address. The second DMA read command causes a pointer to the next emulation routine to be returned from memory 5. In step 310, the third method issues a load command to the pointer storage means 120, such that the pointer to the next emulation routine is stored within the pointer storage means 120. The third method next incorporates the pointer into a host jump instruction in step 312, followed by storing the host jump instruction at a predefined location or in the register of the instruction generation circuit 140 in step 314. The final host instruction within the currently-executing emulation routine preferably retrieves the jump host instruction from the predefined location, after which the host jump instruction is executed to cause a jump to the next emulation routine. After step 314, the third method returns to step 301.

In step 322, the third method determines if a jump instruction to the host operating system has been executed. If the jump instruction to the host operating system has executed, the third method ends. If the jump instruction to the host operating system has not executed, the third method to proceeds to step 330. In step 330, the third method determines if the next host jump instruction is available. In the event that one or more of steps 301 through 314 are not completed before the current emulation routine arrives at the jump to the predetermined location, step 330 ensures that the preferred method waits for the next host jump instruction before proceeding. If the next host jump instruction is not available, the third method remains at step 330 until the instruction is available. If the next host jump instruction is available, the third method proceeds to step 332 and retrieves the jump host instruction from the predefined location. Following step 332, the third method executes the host jump instruction in step 334, thereby jumping to the beginning of the next emulation routine. The third method then returns to step 300 to execute this emulation routine. In the third method, a final source instruction's emulation routine does not execute the jump host instruction to the next emulation routine, but rather executes the jump to the host operating system. This allows for successful termination of the emulation.

While the present invention has been described with reference to certain preferred embodiments, those skilled in the art will recognize that various modifications may be provided. For example, modifications might include, but would not be limited to, implementation of the prefetch state machine 50 using a programmable logic array (PLA) or application specific integrated circuit (ASIC) rather than combinational logic, or implementing the EPC as an accumulator, thereby eliminating the need for the summing means. These and other variations upon and modifications to the preferred embodiments are provided for by the present invention which is limited only by the following claims.

What is claimed is:

1. An apparatus for retrieving and storing a pointer to a next emulation routine during execution of a current emulation routine in a computer system having a central processing unit and a memory coupled by a control bus, a data bus, and an address, said apparatus comprising:

an emulated program counter having a control input, a load input, and an output, for storing an address of a next source instruction to be emulated, the emulated program counter storing data on the data bus in response to a first signal on the control input of the emulated program counter, the control input of the emulated program counter coupled to the control bus, the load input of the emulated program counter coupled to the data bus, and the output of the emulated program counter coupled to the address bus;

a pointer storage means having a control input, a data input, and a data output, for storing a pointer to the next emulation routine in response to a second signal on the control input of the pointer storage means, the control input of the pointer storage means coupled to the control bus, the data input of the pointer storage means coupled to the data bus, and the data output of the pointer storage means coupled to the data bus; and a prefetch state machine having a control input, an increment input, an increment output, and a control output, for detecting when the emulated program counter has been updated, retrieving a pointer to the next emulation routine to be executed from the memory and storing the pointer in the pointer storage means, the control input of the prefetch state machine coupled to the control bus, the increment input of the prefetch state machine coupled to the address bus, and the control output of the prefetch state machine coupled to the control bus.

2. The apparatus of claim 1, further comprising a summing means having a first input, a second input, and an output, for incrementing the address stored in the emulated program counter in response to an increment signal from the prefetch state machine, the first input of the summing means coupled to the output of the emulated program counter, the second input of the summing means coupled to the increment output of the prefetch state machine, and the output of the summing means coupled to the load input of the emulated program counter.

3. The apparatus of claim 2, wherein the summing means is an n-bit binary adder.

4. The apparatus of claim 2, further comprising an opcode storage means, having a control input, an opcode input, and an output, for receiving an opcode and outputting an address corresponding to the opcode received, the control input of the opcode storage means coupled to the control bus, the opcode input coupled to the data bus, and the output of the opcode storage means coupled to the address bus.

5. The apparatus of claim 4, wherein the opcode storage means is a register formed from a plurality of D-flip-flops.

6. The apparatus of claim 4, wherein the data bus has a plurality of data bits and the opcode input is coupled to a subset of the plurality of data bits forming the data bus, the subset being representative of the opcode.

7. The apparatus of claim 4, wherein the opcode storage means is a buffer having a plurality of registers, and wherein the prefetch state machine performs a burst memory read operation that allows a plurality of opcodes to be stored in the opcode storage means.

8. The apparatus of claim 1, wherein the emulated program counter is a register formed from a plurality of D-flip-flops.

9. The apparatus of claim 1, wherein the prefetch state machine comprises:

a decoding circuit having an input, a decode output, and an acknowledgment output, for detecting an update to the emulated program counter, and for generating an increment signal and an acknowledgment signal, the input of the decoding circuit coupled to the address bus, and the acknowledgment output coupled to the data bus to provide the acknowledgment signal;

a signal detection circuit having an input and an output, for generating a detect signal in response to the presence of a signal corresponding to a load emulated program counter command on the control bus, the input of the signal detection circuit coupled to the control bus; and a control circuit, having a first input, a second input, and a command output, for issuing a sequence of commands in response to signals from the decoding circuit and the signal detection circuit, the first input of the control circuit coupled to the acknowledgment output of the decoding circuit, the second input of the control circuit coupled to the output of the signal detection circuit, and the command output coupled to the control bus.

10. The apparatus of claim 9, wherein the decoding circuit is a digital decoder having a plurality of inputs, each of the inputs of the decoder coupled to a respective one of the lines forming the address bus, and wherein the address for the emulated program counter is predetermined, and the decoder output asserts the acknowledgment signal when the predetermined address is on the address bus.

11. The apparatus of claim 9, wherein the signal detection circuit is formed of combinational logic providing a plurality of inputs, each of the inputs of the combinational logic coupled to a respective one of the lines forming the control bus, wherein the load emulated program counter command has a predetermined value, and wherein the signal detection circuit determines whether the signal asserted on the control bus is the same as the predetermined value.

12. The apparatus of claim 9, wherein the control circuit comprises combinational logic coupled to form a state machine that sequentially asserts signals on the control bus for the following commands: load emulated program counter command, read direct memory access command, load opcode command, read direct memory access command, and load pointer command.

13. The apparatus of claim 1, further comprising an instruction generation circuit having an data input, a control input, and an output for generating an instruction with the pointer stored in the pointer storage means embedded within the instruction, the data input of the instruction generation circuit coupled to the output of the pointer storage means, the control input of the instruction generation circuit coupled to the control bus, and the output of the instruction generation circuit coupled to the data bus.

14. The apparatus of claim 13, wherein the instruction generation circuit includes:

a plurality of line drivers each of the line drivers coupled between a respective output of the instruction generation circuit and a line of the data bus; and a decoder having inputs coupled to the control bus, an output of the decoder coupled to the line drivers for selectively coupling the line drivers to the data bus in response to the signals on the control bus.

15. A method for retrieving and storing a pointer to a next emulation routine during execution of a current emulation routine in a computer system having a central processing unit and a memory coupled by, said method comprising the steps of:

beginning execution of a current emulation routine on the central processing unit;

during execution of the current emulation routine, storing an address for the next source instruction to be emulated in the emulated program counter using the central processing unit;

during execution of the current emulation routine, performing as many of the following steps as possible:

retrieving the next source instruction from memory using the address stored in the emulated program counter;

retrieving a pointer to the next emulation routine from memory using the next source instruction retrieved; and storing the pointer to the next emulation routine in a pointer storage means.

16. The method of claim 15, further comprising the following steps during execution of the current emulation routine:

monitoring the control bus for a signal to load the emulated program counter; and detecting the signal to load the emulated program counter.

17. The method of claim 15, wherein the steps of retrieving the next source instruction and retrieving a pointer are direct memory access read operations; and wherein a plurality of bits of the next source instruction is used to indicate a memory location corresponding to the next emulation routine pointer.

18. The method of claim 15 further comprising the step of loading a next source instruction opcode into an opcode storage means after the step of retrieving the next source instruction from memory.

19. The method of claim 18, wherein the step of retrieving a pointer to the next emulation routine uses the value within the opcode storage means as a memory read address.

20. The method of claim 15 further comprising the steps of:

forming a jump instruction including the pointer to the next emulation routine;

storing the jump instruction at a predefined location in memory; and reading the predefined location and executing the jump instruction.

* * * * *